Figure 1:
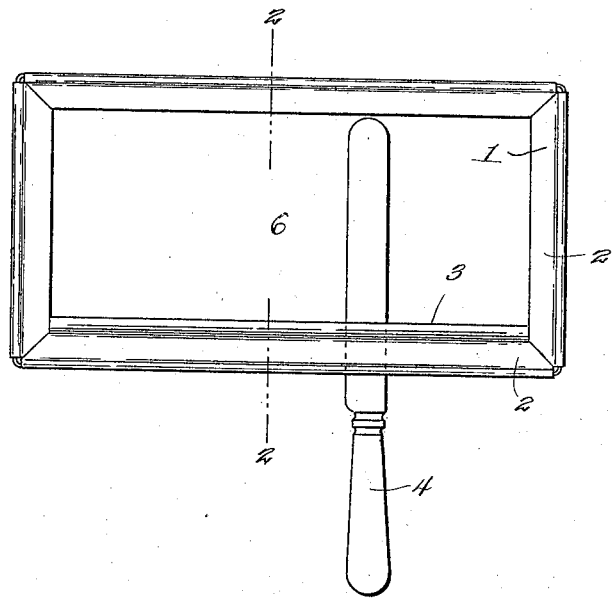

G. E. HILL.
PASTRY PAN.
APPLICATION FILED OCT. 29, 1912.

1,181,448.

Patented May 2, 1916.

WITNESSES
Wm E Valks Jr.
Rohe Meyer.

INVENTOR
G. Edward Hill,
Attorney

THE COLUMBIA PLANOGRAPH CO., WASHINGTON, D. C.

UNITED STATES PATENT OFFICE.

GEORGE EDWARD HILL, OF TROY, NEW YORK.

PASTRY-PAN.

1,181,448.   Specification of Letters Patent.   Patented May 2, 1916.

Application filed October 29, 1912. Serial No. 728,512.

*To all whom it may concern:*

Be it known that I, GEORGE EDWARD HILL, a citizen of the United States, residing at Troy, in the county of Rensselaer and State of New York, have invented certain new and useful Improvements in Pastry-Pans, of which the following is a specification.

This invention relates to pastry pans and more particularly to a pan of this nature provided with a longitudinal slot at the lower edge of one side for the reception of the knife or similar object to loosen the pastry from the bottom of the pan thus facilitating the removal of said pastry from the pan.

It is well known that many cakes or other pastries adhere to the bottom of the pan when they are being removed therefrom thus causing large portions to break from the cake and detracting from the beauty and attractiveness thereof.

It is an object of this invention to provide a pan with a longitudinal opening adjacent to the bottom for the reception of a knife or similar device to loosen the cake or other pastries from the bottom and thus allowing it to be removed intact from the pan.

With the foregoing and other objects in view my invention relates to such details of construction and in the arrangement and combination of the parts as will be hereinafter set forth, shown in the drawings and claimed.

In describing my invention in detail reference will be had to the accompanying drawings wherein like characters denote like or corresponding parts throughout the several views, and in which:—

Figure 2:
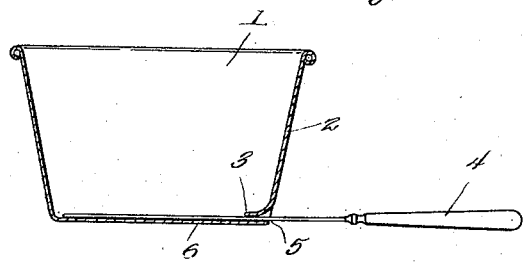
Figure 3:
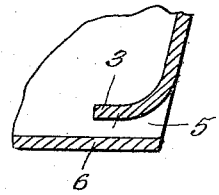

Figure 1 is a top plan view of the improved pan showing a knife inserted in the slot or opening. Fig. 2 is a sectional view on line 2—2 of Fig. 1. Fig. 3 is a detail view of a portion of the pan.

In the drawings, 1 denotes a pan, constructed of any desirable material, preferably tin or granite ware, having the lower edge of its side 2 adjacent the bottom of said pan bent inwardly to form a flange or guide 3 for a knife or similar object 4. A slot or opening 5 is formed between the guide 3 and the bottom 6 of the pan directly adjacent to the latter and is adapted for the reception of the knife, which in being moved longitudinally with the slot cuts the cake or other pastry loose from the bottom of the pan, thus facilitating the removal of the pastry. The guide or flange 3 tends to keep the blade of the knife 4 in a horizontal position and parallel with the bottom of the pan thus preventing its marring or gouging the pastry.

Certain features and combination of parts are herein set forth which in practical fields may necessitate changes to which the patentee is entitled provided the alterations are comprehended within the scope of what is claimed.

The invention having been set forth what is claimed as new and useful is:—

1. A pastry pan having a longitudinal opening extending substantially from one end of the pan to the other and adjacent the bottom thereof, and means adjacent said opening and extending interiorly of said pan to provide guiding means for a knife, for the purpose set forth.

2. A pastry pan having a longitudinal opening extending substantially from one end of the pan to the other and positioned adjacent the bottom thereof, said opening having its upper edge bent inwardly to form a guide flange for a knife for the purpose set forth.

G. EDWARD HILL.

Witnesses:
CHESTER G. WAGER,
DORA SIVERS HILL.

Copies of this patent may be obtained for five cents each, by addressing the "Commissioner of Patents, Washington, D. C."